United States Patent
Sethi et al.

(10) Patent No.: US 12,210,624 B2
(45) Date of Patent: Jan. 28, 2025

(54) METHOD TO CLONE AND/OR MIGRATE THE APPLICABLE BIOS SETTINGS IN A DEVICE TWIN/MIGRATION ENVIRONMENT

(71) Applicant: Dell Products L. P., Round Rock, TX (US)

(72) Inventors: Parminder Singh Sethi, Ludhiana (IN); Lakshmi Saroja Nalam, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 124 days.

(21) Appl. No.: 18/181,685

(22) Filed: Mar. 10, 2023

(65) Prior Publication Data

US 2024/0303341 A1 Sep. 12, 2024

(51) Int. Cl.
*G06F 21/57* (2013.01)

(52) U.S. Cl.
CPC .................................. *G06F 21/572* (2013.01)

(58) Field of Classification Search
CPC .................................................... G06F 21/572
See application file for complete search history.

(56) References Cited

U.S. PATENT DOCUMENTS

| | | | |
|---|---|---|---|
| 6,229,538 B1 | 5/2001 | Mcintyre et al. | |
| 6,671,802 B1 * | 12/2003 | Ott | G06F 9/44505 713/100 |
| 6,757,838 B1 * | 6/2004 | Chaiken | G06F 9/4403 714/E11.133 |
| 7,590,981 B2 | 9/2009 | Gupta et al. | |
| 8,078,448 B1 | 12/2011 | Wohlberg et al. | |
| 8,090,819 B1 | 1/2012 | Ramamurthy | |
| 9,086,941 B1 | 7/2015 | Siegel | |
| 9,444,717 B1 * | 9/2016 | Aithal | H04L 41/0897 |
| 11,128,701 B1 | 9/2021 | Virtuoso | |
| 2006/0026415 A1 * | 2/2006 | Chen | G06F 8/65 713/2 |
| 2006/0029097 A1 | 2/2006 | Mcgee et al. | |
| 2008/0148031 A1 * | 6/2008 | Brown | G06F 9/44505 713/1 |
| 2009/0103430 A1 | 4/2009 | Wang | |
| 2011/0035498 A1 | 2/2011 | Shah et al. | |
| 2011/0113224 A1 | 5/2011 | Isshiki et al. | |
| 2011/0225274 A1 * | 9/2011 | Dvorkin | G06F 9/44505 709/222 |

(Continued)

*Primary Examiner* — Faisal M Zaman
(74) *Attorney, Agent, or Firm* — Chamberlain, Hrdlicka, White, Williams & Aughtry; Aly Dossa

(57) ABSTRACT

Embodiments described herein relate to methods, systems, and non-transitory computer readable mediums storing instructions for migrating BIOS settings to a new computational device. Using telemetry and other sources, one or more embodiments of the invention determine the identity of the one or more hardware elements and from that produces a compatible tree for the new computation device. The method then retrieves previous BIOS settings that are to be migrated, and determines, using the compatible tree, one or more BIOS settings of the previous BIOS settings that need to be changed. The BIOS is changed, and the updated BIOS settings are then migrated to the new computational device, wherein the BIOS on the new computational device is configured with the updated BIOS settings.

17 Claims, 9 Drawing Sheets

(56) References Cited

U.S. PATENT DOCUMENTS

| | | | |
|---|---|---|---|
| 2015/0081829 A1* | 3/2015 | Maity | G06F 21/572 |
| | | | 709/212 |
| 2015/0169291 A1 | 6/2015 | Dube | |
| 2015/0278219 A1 | 10/2015 | Phipps | |
| 2016/0011880 A1* | 1/2016 | Maity | G06F 9/4401 |
| | | | 710/261 |
| 2016/0162280 A1 | 6/2016 | Murayama et al. | |
| 2017/0155573 A1 | 6/2017 | Khemani | |
| 2018/0113728 A1 | 4/2018 | Musani et al. | |
| 2018/0152341 A1 | 5/2018 | Maeda et al. | |
| 2018/0203739 A1 | 7/2018 | Brady | |
| 2018/0232458 A1* | 8/2018 | Fitzgerald | G06F 16/2291 |
| 2018/0267832 A1 | 9/2018 | Biener | |
| 2019/0318039 A1* | 10/2019 | Nozhchev | G06F 16/256 |
| 2019/0391798 A1* | 12/2019 | Farrell | G06F 11/3672 |
| 2020/0007629 A1 | 1/2020 | Tse et al. | |
| 2020/0076717 A1 | 3/2020 | Rantzau et al. | |
| 2020/0104113 A1 | 4/2020 | Grill et al. | |
| 2020/0156243 A1 | 5/2020 | Ghare et al. | |
| 2020/0311573 A1 | 10/2020 | Desai | |
| 2020/0403985 A1 | 12/2020 | Mahadevan | |
| 2021/0089325 A1* | 3/2021 | Suryanarayana | G06F 9/455 |
| 2022/0019561 A1 | 1/2022 | Jose | |
| 2022/0036224 A1 | 2/2022 | Sethi | |
| 2022/0383324 A1 | 12/2022 | Sheshadri | |
| 2023/0029888 A1 | 2/2023 | Wang | |
| 2023/0117047 A1* | 4/2023 | Francis | G06F 9/4893 |
| | | | 718/104 |
| 2023/0168929 A1 | 6/2023 | Wadekar | |
| 2023/0236844 A1* | 7/2023 | Sethu | G06F 1/24 |
| | | | 713/100 |
| 2023/0239195 A1 | 7/2023 | Mirgorodskiy et al. | |
| 2023/0350717 A1 | 11/2023 | Neate | |
| 2024/0032081 A1 | 1/2024 | Sun | |
| 2024/0070050 A1* | 2/2024 | Pahwa | G06F 11/2284 |
| 2024/0184682 A1* | 6/2024 | Vudathu | G06F 11/3006 |

* cited by examiner

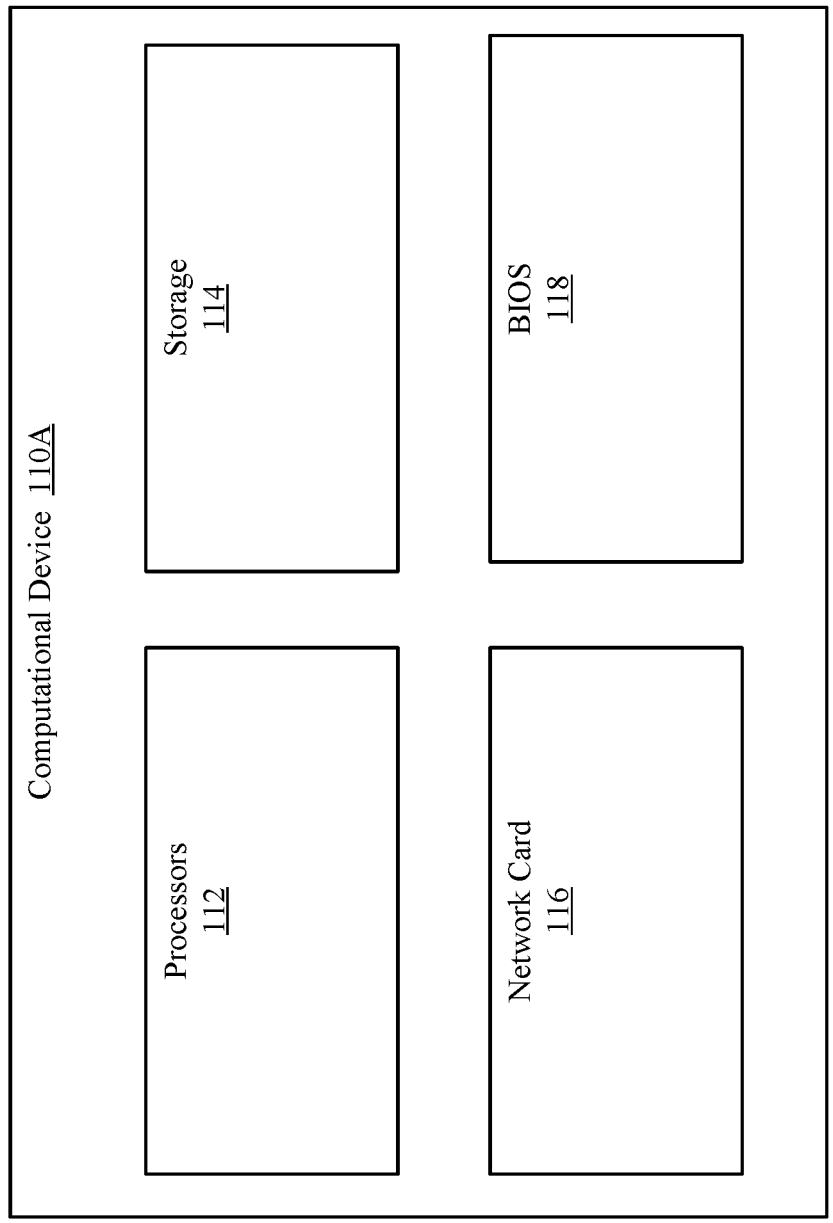

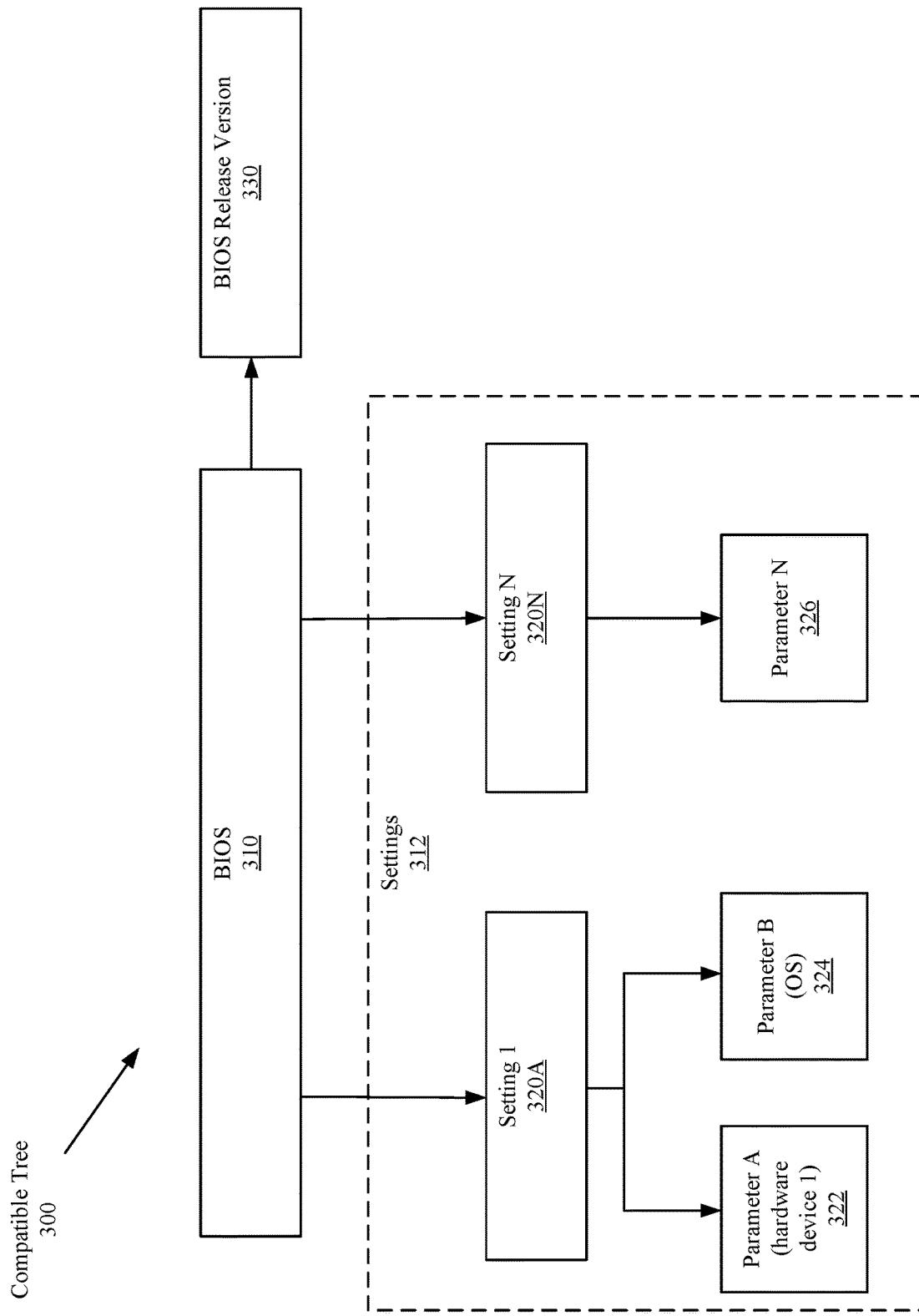

METHOD TO CLONE AND/OR MIGRATE THE APPLICABLE BIOS SETTINGS IN A DEVICE TWIN/MIGRATION ENVIRONMENT

BACKGROUND

Computing devices often exist in environments that include many devices (e.g., servers, virtualization environments, storage devices, network devices, etc.). Such environments may, from time to time, in whole or in part, require being replicated (e.g., backed-up) and/or migrated (e.g., moved from one set of devices to another). Such replications and/or migrations often require copious amounts of investigation, coordination, time, and manual steps to be performed by any number of system administrators. When a migration is performed, the computing device may have to be taken off-line, this may affect other devices and applications that are dependent on it to function or obtain data.

SUMMARY

In general, embodiments described herein relate to a method for migrating BIOS settings to a new computational device. The method begins by retrieving telemetry from the new computational device and identifying the one or more hardware elements comprising the new computational device. Using the identity of the one or more hardware elements, a compatible tree for the new computation device is created. The method then retrieves previous BIOS settings that are to be migrated and determines using the compatible tree one or more BIOS settings of the previous BIOS settings that need to be changed. The method creates new BIOS settings for the one or more BIOS settings that need to be changed and updates the previous BIOS setting with the new BIOS settings to produce updated BIOS settings. The updated BIOS settings are then migrated to the new computational device, wherein the BIOS on the new computational device is configured with the updated BIOS settings.

In general, embodiments described herein relate to a non-transitory computer readable medium comprising computer readable program code. The computer readable code, which when executed by a computer processor, enables the computer processor to perform a method for migrating BIOS settings to a new computational device. The method begins by retrieving telemetry from the new computational device and identifying the one or more hardware elements comprising the new computational device. Using the identity of the one or more hardware elements, a compatible tree for the new computation device is created. The method then retrieves previous BIOS settings that are to be migrated and determines, using the compatible tree, one or more BIOS settings of the previous BIOS settings that need to be changed. The method creates new BIOS settings for the one or more BIOS settings that need to be changed and updates the previous BIOS setting with the new BIOS settings to produce updated BIOS settings. The updated BIOS settings are then migrated to the new computational device, wherein the BIOS on the new computational device are configured with the updated BIOS settings.

In general, embodiments described herein relate to a system comprising of an old computational device, a new computational device, and a checker. The checker comprises at least one processor, a storage device, and at least one memory. The memory includes instructions, which, when executed by the processor, perform a method for migrating BIOS settings to the new computational device from the old computational device. The method begins by retrieving telemetry from the new computational device and identifying the one or more hardware elements comprising the new computational device. Using the identity of the one or more hardware elements, a compatible tree for the new computation device is created. The method then retrieves previous BIOS settings that are to be migrated and determines using the compatible tree one or more BIOS settings of the previous BIOS settings that need to be changed. The method creates new BIOS settings for the one or more BIOS settings that need to be changed and updates the previous BIOS setting with the new BIOS settings to produce updated BIOS settings. The updated BIOS settings are then migrated to the new computational device, wherein the BIOS on the new computational device are configured with the updated BIOS settings.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1B shows a detail diagram of a computational device in accordance with one or more embodiments of the invention.

FIG. 3 shows a sample compatible tree in accordance with one or more embodiments of the invention.

DETAILED DESCRIPTION

Figure 1A:
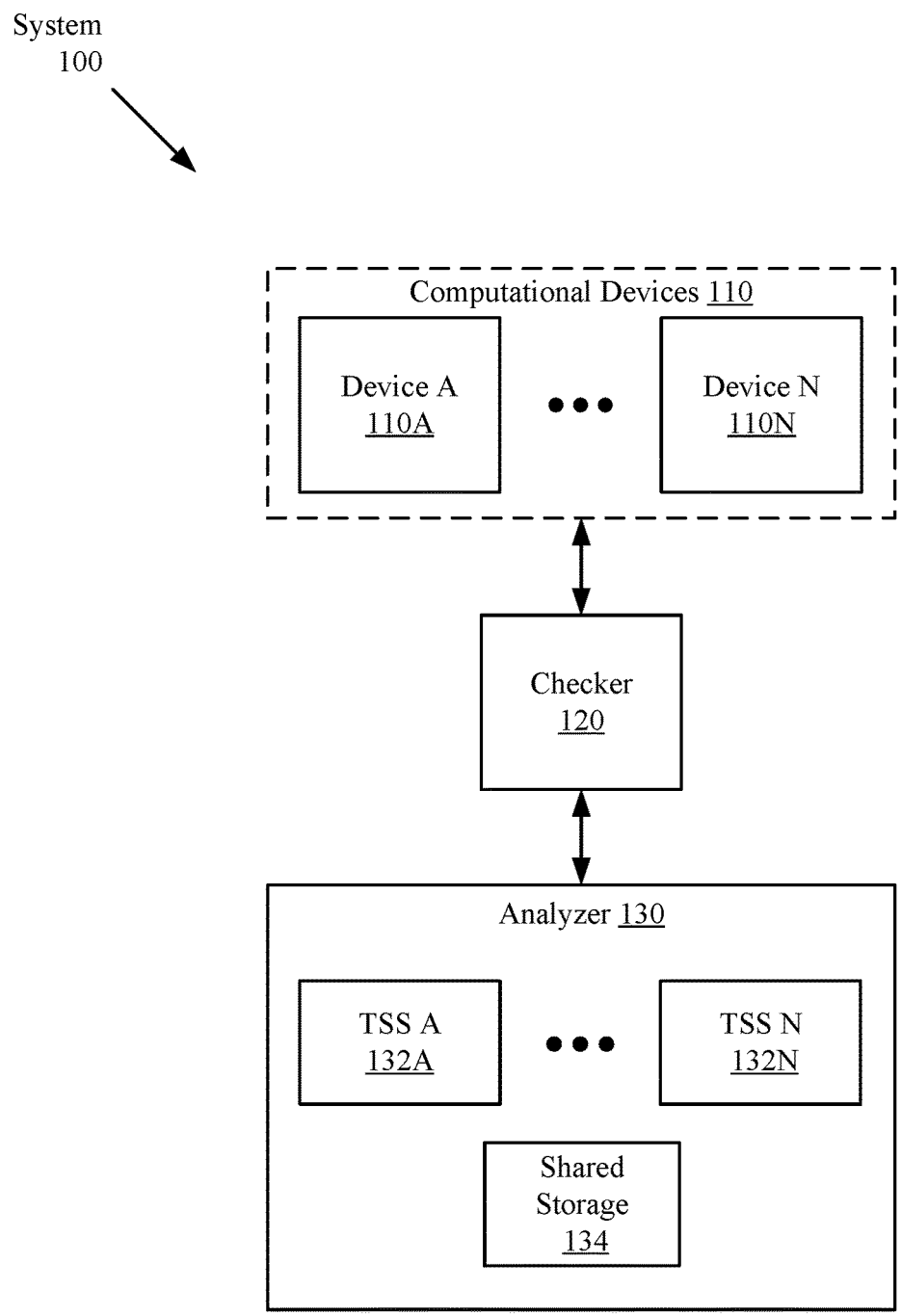
FIG. 1A shows a diagram of a system in accordance with one or more embodiments of the invention.

In the below description, numerous details are set forth as examples of embodiments described herein. It will be understood by those skilled in the art and having the benefit of this Detailed Description that one or more embodiments of the embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regards to a figure, in various embodiments described herein, may be equivalent to one or more like-named components described with regard to any other figure. For brevity, descriptions of these components will not be repeated with regards to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In an enterprise environment, a data center may be made up of a plurality of interconnected nodes and/or servers. When the data center needs to add another computational device (e.g., a server), such as when a preexisting device is failing or greater capacity is desired, the existing device(s) must be migrated with data and BIOS settings in order to properly function. However, migrating the BIOS settings often must be done manually and is subject to human errors and compatibility issues.

Similarly, when a consumer and/or a standalone computational device needs migrating to another device, many customers/users want the preexisting settings migrated along with pertinent data. Often, this may additionally require the BIOS settings in the existing device to be migrated to another device. However, performing this migration is often beyond the skill of a user/customer, and/or the user/customer would have the same difficulties as in the above enterprise environment.

One or more embodiments of the invention seeks to overcome these difficulties and make the migrating of BIOS settings between old and new computational devices less prone to human errors and have better outcomes both in an enterprise environment and a consumer/standalone environment. In general, embodiments described herein relate to methods, systems, and non-transitory computer readable mediums storing instructions for performing a migration of a BIOS between an old computational device and new computational device. The methods determine which settings, if any, need to be altered to consider changes in the hardware of the new computational device compared to the old computational device with little or no user effort.

FIG. 1A shows a diagram of a system that performs the claimed methods in one or more embodiments of the invention. The system includes a plurality of computational devices (110), a checker (120), and an analyzer (130) in accordance with one or more embodiments described herein. For simplicity, the system shown in FIG. 1A only shows two computational devices (110A and 110N); however, they are only representative and a subset of the system.

The computational devices (e.g., 110) may comprise of a plurality of devices (e.g., 110A-110N) such as, but not limited to, datacenters, personal computers (PCs), laptops, and any other computation device that may have its hardware upgraded and/or replaced. For simplicity, the system shown in FIG. 1A only shows two devices (110A, 110N), however, they are only representative, and a subset of the system and the system may include any number of datacenters that are geographically dispersed (for example, in a non-limiting example one or more located on each continent). Further, in one or more embodiments of the invention, one or more computational devices (e.g., 110A-110N) may be located at the same facility and/or one or more datacenters located remotely in other locations that are geographically dispersed. The computation devices (e.g., 110) will be described in more detail with regards to FIG. 1B.

Figure 6:
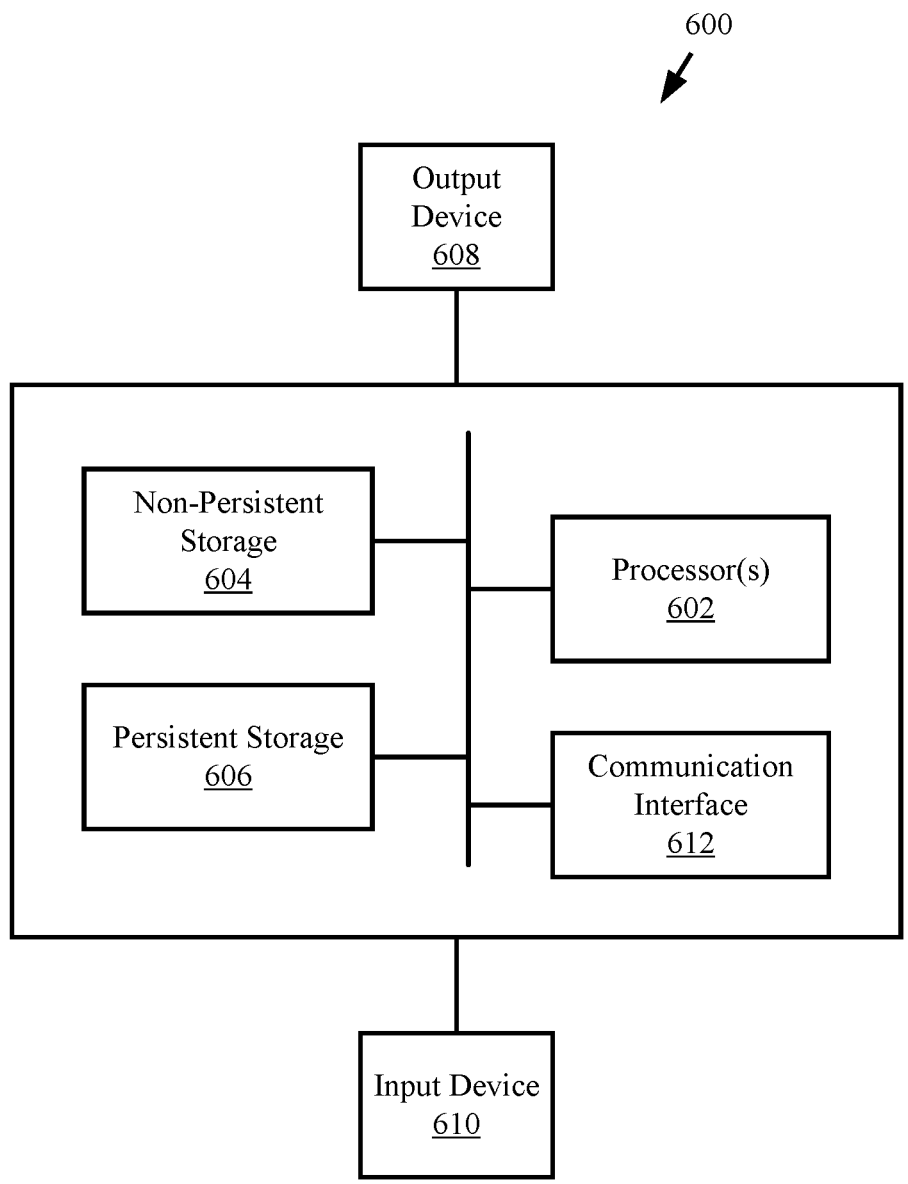
FIG. 6 shows a computing system in accordance with one or more embodiments of the invention.

In one or more embodiments of the invention, each of the computational devices (e.g., 110A-110N) is implemented as a computing device (see e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device, cause the computing device to perform the functionality of each computational device (e.g., 110A-110N) described throughout this application.

In one or more embodiments of the invention, each computational device (e.g., 110A-110N) is implemented as a logical device. The logical device may utilize the computing resources of any number of computing devices, and thereby provide the functionality of the computational device (e.g., 110A-110N) described throughout this application.

The one or more computational devices (e.g., 110), in one or more embodiments of the invention, hosts one or more applications. These applications, in one or more embodiments of the invention, perform computer implemented services for clients (not shown). Performing the computer implemented services may include performing operations on assets (applications related data or other data) that are stored in virtual storage devices that are either part of the computational devices (e.g., 110) or separate connected storage devices (not shown). The operations may include creating elements of assets, moving elements of assets, modifying elements of assets, deleting elements of assets, and other and/or additional operations on asset data without departing from the invention. The application(s) may be, for example, instances of databases, email servers, and/or other applications. The computational devices (e.g., 110) may host other types of applications without departing from the invention, including hosting applications that function as the checker (120) and/or the analyzer (130).

In one or more embodiments of the invention, the applications are implemented as computer instructions, e.g., computer code, stored on a persistent storage or virtual storage devices, that when executed by a processor(s) of the computational devices (e.g., 110) cause the computational devices (e.g., 110A-110N) to provide the functionality of the application(s) described throughout this application. One or more of the computational devices (e.g., 110A-110N) may take the form as described in more detail in FIG. 1B.

In one or more embodiments of the invention, the computational devices (e.g., 110) may be implemented as computing devices (e.g., 600, FIG. 6). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions stored on the persistent storage that, when executed by the processor(s) of the computing device, cause the computing device to perform the functionality of the computational devices (e.g., 110) described throughout this application.

In one or more embodiments of the invention, the system includes a checker (120). The checker (120) performs checks on applications prior to bringing them online and at other times as needed. In one or more embodiments of the invention, the checker (120) examines the hardware and configurations of the one or more computational devices (e.g., 110) in order to migrate the BIOS from one computational device (e.g., 110A) to another (e.g., 110N), as will be described in more detail with regards to the methods shown in FIGS. 4 and 5.

In one or more embodiments of the invention, the checker (e.g., 120) and/or analyzer (130), determines the BIOS settings that are to be migrated by the checker (e.g., 120) and other applications or components of the system. Other components of the system may include, but are not limited to, storage locations, such as storage devices that include the data for a database. The components may also include the physical computational devices that serve as hosts for the application and/or related applications.

In one or more embodiments of the invention, the checker (120) may be implemented as computing devices (e.g., 600, FIG. 6). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage that, when executed by the processor(s) of the computing device, cause the computing device to perform the functionality of the checker (120) described throughout this application.

Additionally, the system (100) includes an analyzer (130). The analyzer (130) includes a plurality of technical support systems (TSSs) (e.g., 132A-132N). The analyzer (130) also includes shared storage (134). In one or more embodiments of the invention, the analyzer (130) uses the information on the hardware, BIOS, and information about applications obtained by the checker (120) from the one or more of the computational devices (e.g., 110) to determine the hardware devices that are associated with each of the computational devices (e.g., 110). In one or more other embodiments of the invention, the checker (120) and/or analyzer (130) continuously monitors each of the computational devices (e.g., 110). In one or more other embodiments of the invention, the analyzer monitors the telemetry and/or logs of the one or more computational devices (e.g., 110) when a user or process indicates that a BIOS from one device (e.g., 110A) needs to be migrated to a new computational device (e.g., 110N) as will be described in more detail with regards to the methods shown in FIGS. 4 and 5 below.

The analyzer (130) analyzes the telemetry and/or other information from the computation devices (e.g., 110) to produce a compatible tree and determine BIOS settings as will be discussed in more detail with regards to the methods shown in FIGS. 4 and 5 below. In one or more embodiments, the compatible tree takes the form shown in FIG. 3, which will be described in more detail below. The analyzer (130) may also have other purposes such as save one or more hardware profile templates in the shared storage (134) for use when future hardware elements are added, so that the hardware profile templates may be reused for identical hardware elements (for example: in a non-limiting example, when replacing a hard drive with an identical hard drive, the previous profile template may be sufficient). Although not shown, the analyzer (130) may also include one or more artificial intelligence engines for assisting the other components of the analyzer (130) in making such things as a compatible tree and/or determining appropriate BIOS settings for a new computational device.

As discussed above, the analyzer (130) includes a plurality of TSS (e.g., 132A-132N). Each of the TSSs (e.g., 132A-132N) may be operably connected to each other via any combination of wired/wireless connections. In one or more embodiments of the invention, the computational devices (e.g., 110) correspond to devices (which may be physical or logical, as discussed below) that have new hardware added to and/or are experiencing failures and that are directly or indirectly connected to the TSSs (e.g., 132A-132N), such that the computational devices (110) provide telemetry and/or logs to the TSS(s) for analysis (as further discussed below).

In one or more embodiments of the invention, each of the TSSs (e.g., 132A-132N) is a system to interact with the customers (via the computational devices (e.g., (110)) in order to resolve technical support issues as well as determine the settings for migrating such things as the BIOS. The TSSs (132A-132N), in one or more embodiments of the invention, are also used for determining device profiles when one or more new hardware elements are added to the system as described in more detail with respect to the methods shown in FIGS. 4 and 5.

In one or more embodiments of the invention, the TSSs (e.g., 132A-132N) are implemented as a computing device (see e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device, cause the computing device to perform the functionality of the TSSs (e.g., 132A-132N) described throughout this application.

In one or more embodiments of the invention, the TSSs (e.g., 132A-132N) are implemented as a logical device. The logical device may utilize the computing resources of any number of computing devices and thereby provide the functionality of the TSSs (e.g., 132A-132N) described throughout this application. Additional details about the TSSs (e.g., 132A-132N) are provided in FIGS. 2A and 2B below.

In one or more embodiments of the invention, the analyzer also includes shared storage (134). The shared storage (134) corresponds to any type of volatile or non-volatile (i.e., persistent) storage device that includes functionality to store unstructured data, structured data, etc. The shared storage (134) may provide storage for the TSS (e.g., 132A-132N) as well as store the component tree and hardware profile templates as will be discussed in more detail with regards to the methods of FIGS. 4 and 5. The shared storage may also store such things as knowledge based (KB) articles, as well as other information that may be used in performing the methods shown in FIGS. 4 and 5. The shared storage (134), in one or more embodiments of the invention, may be separate from the analyzer and/or part of either the computational devices (e.g., 110) and/or the checker (120).

FIG. 1B shows a diagram of a computational device (110A) that, in one or more embodiments of the invention, includes one or more hardware elements, including a new hardware elements. The computational device (110A) is similar to the computational devices (e.g., 110A-110N) described above with regards to FIG. 1A. The computational devices (e.g., 110A) hosts one or more applications and other processes. The computational devices (e.g., 110A) includes one or more processors (112), storage (114), at least one network card (116), and a BIOS (118).

In one or more embodiments of the invention, the computational device (110A) may host production hosts and/or virtual machines (VMs) that host one or more applications, web services, and/or databases. Each of the computational devices (e.g., 110A) may host any number of production hosts and/or VMs that, in turn, host any number of applications.

In one or more embodiments of the invention, the computational device (110A) may be implemented as computing devices (e.g., 600, FIG. 6). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the computational device (e.g., 110A) described throughout this application.

The computational device (110A), in one or more embodiments of the invention, includes one or more processors (112). The processor(s) (e.g., 112) may be a physical device, or it may be implemented as a logical device. The logical device may utilize the computing resources of any number of computing devices and thereby provide the functionality of the processor(s) (e.g., 112) described throughout this application.

The processor(s) (e.g., 112) host one or more applications that may comprise of web services, databases, operating systems (OS), games, virtual machines, and/or any other applications that one or more users or processes depend on. The processor(s) (e.g., 112) may host or be operatively connected to at least one storage device (e.g., 114).

In one or more embodiments, the computational device (110A) includes storage (114) that may be physical storage or logical/virtual storage e.g., (not shown) that is connected to the processor (112). The storage device (114) may be one or more physical storage devices such as a hard disk drive, solid disk drive, tape drives, and or other physical storage mediums of any number of computing devices. Additionally, the device (110A) may utilize remote storage or resources such as those located externally on a cloud environment, other device (e.g., 110A-110N, FIG. 1A), or other location. The logical storage devices may utilize any quantity of hardware storage resources of any number of computing devices for storing data. For example, the storage may utilize portions of any combination of hard disk drives, solid state disk drives, tape drives, and/or any other physical storage medium of any number of computing devices. Alternatively, or in addition, in one or more embodiments of the invention, the virtual storage devices may instead be physical storage devices of any number of computing devices.

The computational devices may additionally be connected through one or more networks (not shown) including the Internet. In order to communicate with the networks, the computational device (110A), in one or more embodiments of the invention, may include a network card (NIC) (116). The NIC (116) allows the processor (112), storage (114), the bios (118), and other hardware elements (not shown) to communicate with other computational devices (e.g., 120A-120N, FIG. 1A) such as clients (not shown), users (not shown) and other computer systems such as one or more edge environments (not shown) and/or cloud-based storage environments (not shown). Both the computational device (110A) and/or the system (e.g., 100, FIG. 1A) and optional connected edge and cloud-based systems may be public or private (such as an internal or corporate cloud run by the owner of the system (100) shown in FIG. 1A).

A network may refer to an entire network or any portion thereof (e.g., a logical portion of the devices within a topology of devices). A network may include a datacenter network, a wide area network (WAN), a local area network (LAN), a wireless network, a cellular phone network, and/or any other suitable network that facilitates the exchange of information from one part of the network to another. A network may be located at a single physical location or be distributed at any number of physical sites. In one or more embodiments, the network may be coupled with or overlap, at least in part, with the Internet.

In one or more embodiments, the network may include any number of devices within any of the components of the system. In one or more embodiments, a network device is a device that includes and/or is operatively connected to persistent storage (not shown), memory (e.g., random access memory (RAM)) (not shown), one or more processor(s) (e.g., integrated circuits) (not shown), and at least two physical network interfaces, which may provide connections (i.e., links) to other devices (e.g., computing devices, other network devices, etc.). In one or more embodiments, a network device also includes any number of additional components (not shown), such as, for example, network chips, field programmable gate arrays (FPGAs), application specific integrated circuits (ASICs), indicator lights (not shown), fans (not shown), etc. A network device may include any other components without departing from the invention. Examples of a network device include, but are not limited to, a network switch, a router, a multilayer switch, a fibre channel device, an InfiniBand® device, etc. A network device is not limited to the aforementioned specific examples.

The one or more computational devices (e.g., 110A) may communicate over one or more networks using encryption. In one or more embodiments of the invention the individual computational devices (e.g., 110A) may communicate with each other using 128-bit encryption. Other forms of encryption such as, but not limited to, symmetric-key schemes, public-key schemes, RSA, etc. may be used for communicating between the one or more computational devices (e.g., 110A) and other components and entities without departing from the invention.

The computational device (e.g., 110A) may include a BIOS (118). The BIOS may be firmware used to provide runtime services for the operating system and programs operating on the computational device (110). The BIOS tests each of the hardware components when the computational device (110) is activated. The BIOS (118) also facilitates/loads the operating system. The BIOS may take other forms or may be associated with other components such as one or more remote access controllers (RAC) and/or baseboard management controller (BMC).

The computational device (110A) may include additional hardware elements. These devices may be, but are not limited to, as graphics cards, specialty processors, security modules, and any other hardware that a particular application of the computational device (110A) needs. Other devices and modules may be included in the computational device (110A) without departing from the invention.

When a new computational device (e.g., 110A) is added to the system (100), the BIOS (118) is migrated from the old/previous computational device (e.g., 110A). As described in more detail below with regards to the method shown in FIGS. 4 and 5, when the new computational device (e.g., 110A) has different or new hardware elements, the settings (as well as the potentially the contents) of the BIOS (118) must be updated to correspond to the new or different hardware elements. Once the BIOS (118) is updated, the updated BIOS (118) may be migrated and the new computational device (e.g., 110A) may be brought online.

While FIGS. 1A and 1B show a configuration of components, other configurations may be used without departing from the scope of embodiments described herein. For example, although FIG. 1A shows all components as part of two devices, any of the components may be grouped in sets of one or more components which may exist and execute as part of any number of separate and operatively connected devices. Accordingly, embodiments disclosed herein should not be limited to the configuration of components shown in FIGS. 1A and 1B.

Figure 2A:
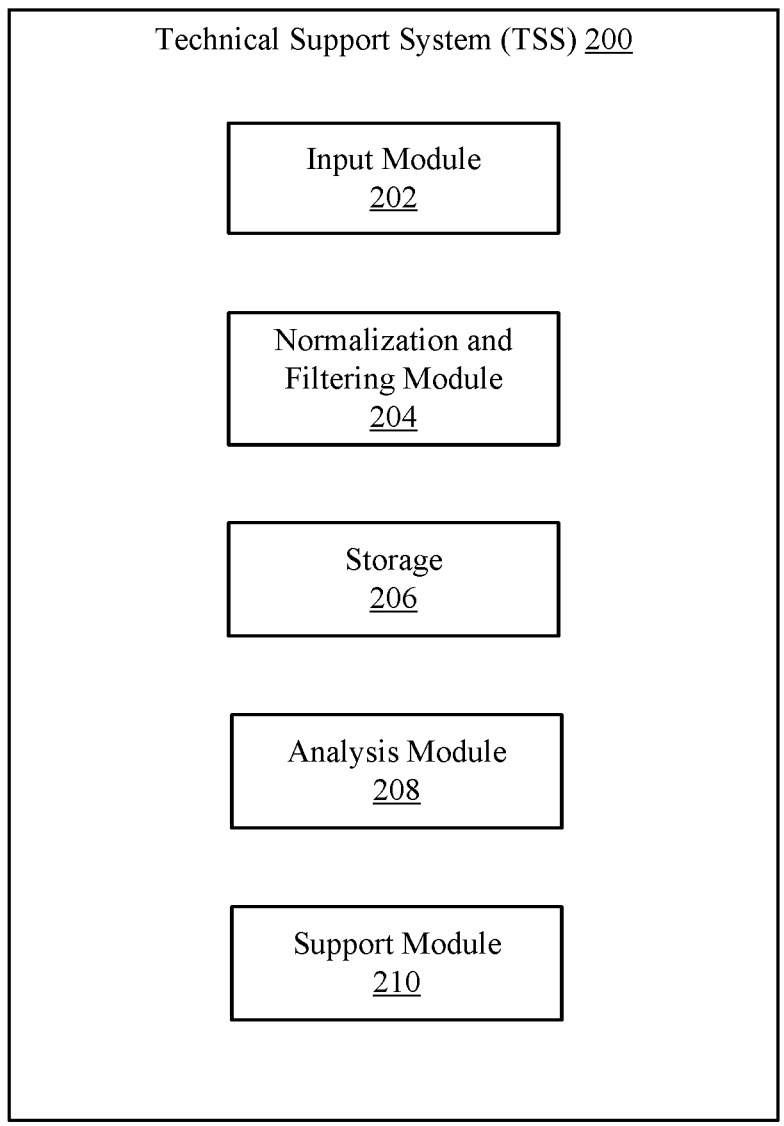
FIG. 2A shows a diagram of a technical support system (TSS) in accordance with one or more embodiments of the invention.

Turning now to FIG. 2A, FIG. 2A shows a diagram of a technical support system (TSS) in accordance with one or more embodiments of the invention. The TSS of FIG. 2A may be similar to that described in FIG. 1A (e.g., 112A-112N). The TSS (200) includes an input module (202), a normalization and filtering module (204), storage (206), an analysis module (208), and a support module (210). Each of these components is described below.

In one or more embodiments of the invention, the input module (202) is any hardware, software, or any combination thereof that includes functionality to obtain system logs (e.g., transition of device states, an alert for medium level of central processing unit (CPU) overheating, new hardware detection, etc.) and important keywords for the computational device (e.g., new hardware identification and configuration) necessary for determining appropriate BIOS settings for the new computational device. The input module (202) may include functionality to transmit the obtained system logs and important keywords to the normalization and filtering module (204) as an input.

In one or more embodiments of the invention, the normalization and filtering module (204) processes the input received from the input module (202) and extracts the relevant data. Additional details for the normalization and filtering module (204) are provided in FIG. 2B.

In one or more embodiments of the invention, the storage (206) corresponds to any type of volatile or non-volatile (i.e., persistent) storage device that includes functionality to store extracted relevant data by the normalization and filtering module (204). In various embodiments of the invention, the storage (206) may also store a device state path.

In one or more embodiments of the invention, the analysis module (208) is configured to predict a next device state of a device based on a current device state of the device. The analysis module (208) may also be able to determine relationships between BIOS settings, hardware components, applications, configurations, and other aspects of the new computational device in order to produce a compatible tree as will be described in more detail below with regards to FIG. 3. The analysis module (208), in one or more embodiments of the invention may use machine learning either alone or in combination with other methods to analyze and determine relationships between BIOS, settings, hardware components, applications, configuration, and other aspects of the computation device new computational device in order to produce a compatible tree. The analysis module (208) may be implemented using hardware, software, or any combination thereof. Additional detail about the analysis module (208) is provided below.

In one or more embodiments of the invention, the support module (210) is configured to obtain solutions or workaround documents for previous and new hardware components. The support module (210) may include functionality to analyze the obtained documents and to store them into the shared storage (e.g., 114, FIG. 1A). Based on a context-aware search performed in the shared storage (e.g., 114, FIG. 1A), the support module provides the most relevant hardware profile templates and using the compatible tree may determine appropriate changes to the BIOS settings for configuring the BIOS of the new computational device. The support module (210) may be implemented using hardware, software, or any combination thereof.

Figure 2B:
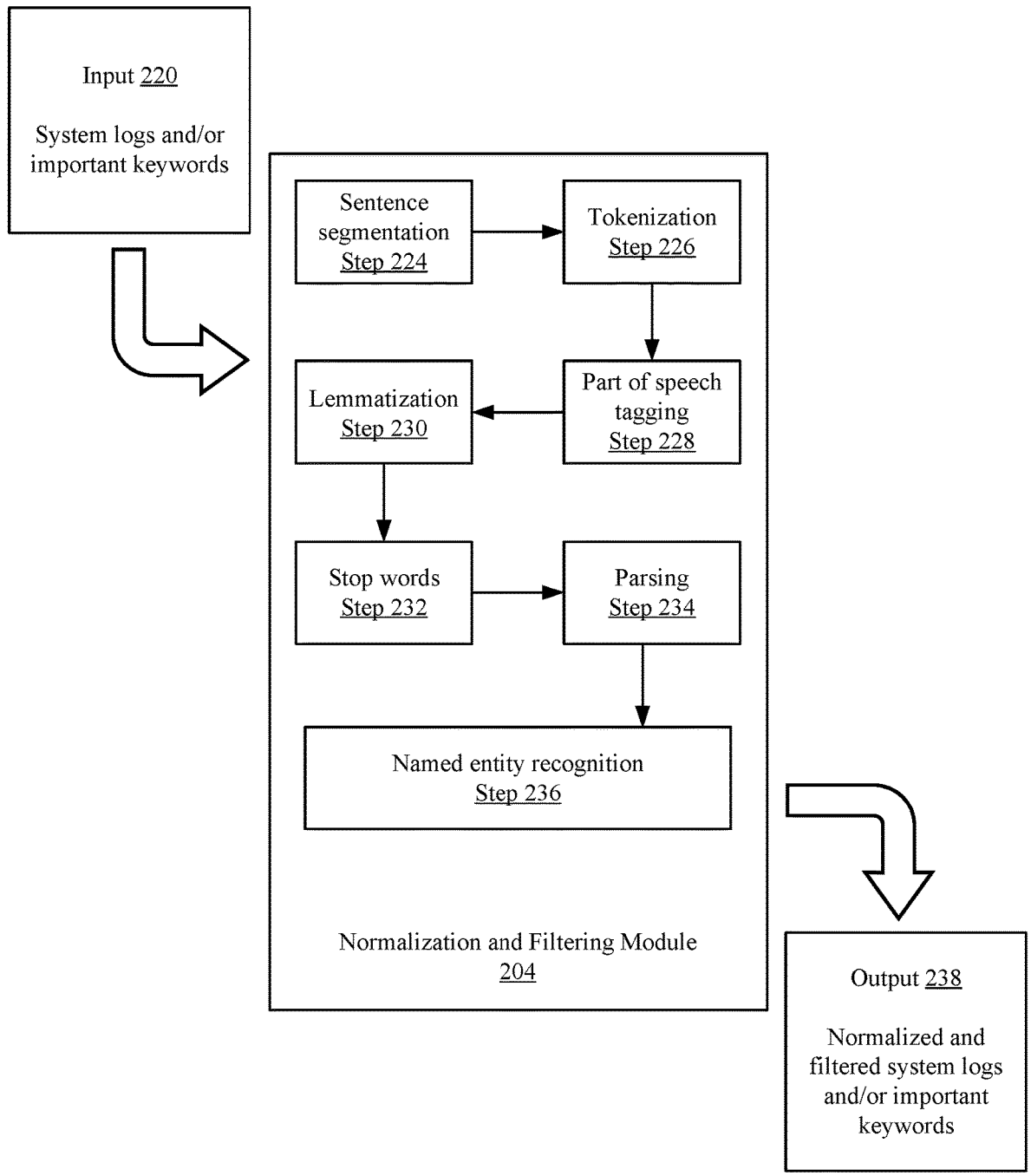
FIG. 2B shows a diagram of a normalization and filtering module and a flowchart about the operation of the normalization and filtering module in accordance with one or more embodiments of the invention.

Turning now to FIG. 2B, FIG. 2B shows a diagram of a normalization and filtering module and a flowchart about the operation of the normalization and filtering module in accordance with one or more embodiments of the invention. The normalization and filter module, in one or more embodiments of the invention, may be used for separating and parsing information such as KB articles, as will be described in more detail below with respect to the method of FIG. 5.

For the sake of brevity, not all components of the normalization and filtering module may be illustrated in FIG. 2B. In one or more embodiments of the invention, the normalization and filtering module (204) may obtain the system logs and important keywords for the computing device from the input module (e.g., 202, FIG. 2A) as an input (220). The operation of the normalization and filtering module (204) is explained below.

In step 224, the input (e.g., Washington, D.C., is the capital of the United States of America. It is also home to iconic museums.) is broken into separate sentences (e.g., Washington, D.C., is the capital of the United States of America).

In step 226, tokenization (e.g., splitting a sentence into smaller portions, such as individual words and/or terms) of important elements of a targeted sentence and the extraction of a token (i.e., keyword) based on the identified group of words occurs. For example, based on step 224, the input is breaking into the smaller portions as "Washington", "D", ".", "C", ".", ",", "is", "the", "capital", "of", "the", "United", "States", "of", "America", ".".

In step 228, a part of speech (e.g., noun, adjective, verb, etc.) of each token will be determined. In one or more embodiments of the invention, understanding the part of speech of each token will be helpful to figure out the details of the sentence. In one or more embodiments of the invention, in order to perform the part of speech tagging, for example, a pre-trained part of the speech classification model may be implemented. The pre-trained part of speech classification model attempts to determine the part of speech of each token based on similar words identified before. For example, the pre-trained part of speech classification model may consider "Washington" as a noun and "is" as a verb.

In step 230, following the part of speech tagging step, a lemmatization (i.e., identifying the most basic form of each word in a sentence) of each token is performed. In one or more embodiments of the invention, each token may appear in different forms (e.g., capital, capitals, etc.). With the help of lemmatization, the pre-trained part of speech classification model will understand that "capital" and "capitals" are originated from the same word. In one or more embodiments of the invention, lemmatization may be implemented according to a look-up table of lemma forms of words based on their part of speech.

Those skilled in the art will appreciate that while the example discussed in step 230 considers "capital" and "capitals" to implement the lemmatization, any other word may be used to implement the lemmatization without departing from the invention.

In step 232, some of the words in the input (e.g., Washington, D.C., is the capital of the United States of America.) will be flagged and filtered before performing a statistical analysis. In one or more embodiments of the invention, some words (e.g., a, the, and, etc.) may appear more frequently than other words in the input and while performing the statistical analysis, they may create a noise. In one or more embodiments of the invention, these words will be tagged as stop words and they may be identified based on a list of known stop words.

Those skilled in the art will appreciate that while the example discussed in step 232 uses "a", "the", and "and" as the stop words, any other stop word may be considered to perform flag and filter operations in the statistical analysis without departing from the invention.

Continuing the discussion of FIG. 2B., in step 234, a process of determining the syntactic structure of a sentence (i.e., a parsing process) is performed. In one or more embodiments of the invention, the parsing process may determine how all the words in a sentence relate to each other by creating a parse tree. The parse tree assigns a single parent word to each word in the sentence, in which the root of the parse tree will be the main verb in the sentence. In addition to assigning the single parent word to each word, the parsing process may also determine the type of relationship between those two words. For example, in the following sentence, "Washington, D.C., is the capital of the United States of America," the parse tree shows "Washington" as the noun and it has a "be" relationship with "capital."

In step 236, following the parsing process, a named entity recognition process is performed. In one or more embodiments of the invention, some of the nouns in the input (e.g., Washington, D.C., is the capital of the United States of America.) may represent real things. For example, "Washington" and "America" represent physical places. In this manner, a list of real things included in the input may be detected and extracted. For this to occur, in one or more embodiments of the invention, the named entity recognition process applies a statistical analysis such that it may distinguish "George Washington", the person, and "Washington", the place, using context clues.

Those skilled in the art will appreciate that while the example discussed in step 236 uses physical location as a context clue for the named entity recognition process, any other context clues (e.g., names of events, product names, dates, and times, etc.) may be considered to perform the named entity recognition process without departing from the invention.

Following step 236, the processed input (220) is extracted as normalized and filtered system logs of the device and/or the important keywords for the computing device as an output (238). In one or more embodiments of the invention, the output (238) may be stored in the storage (e.g., 206, FIG. 2A).

Figure 2C:
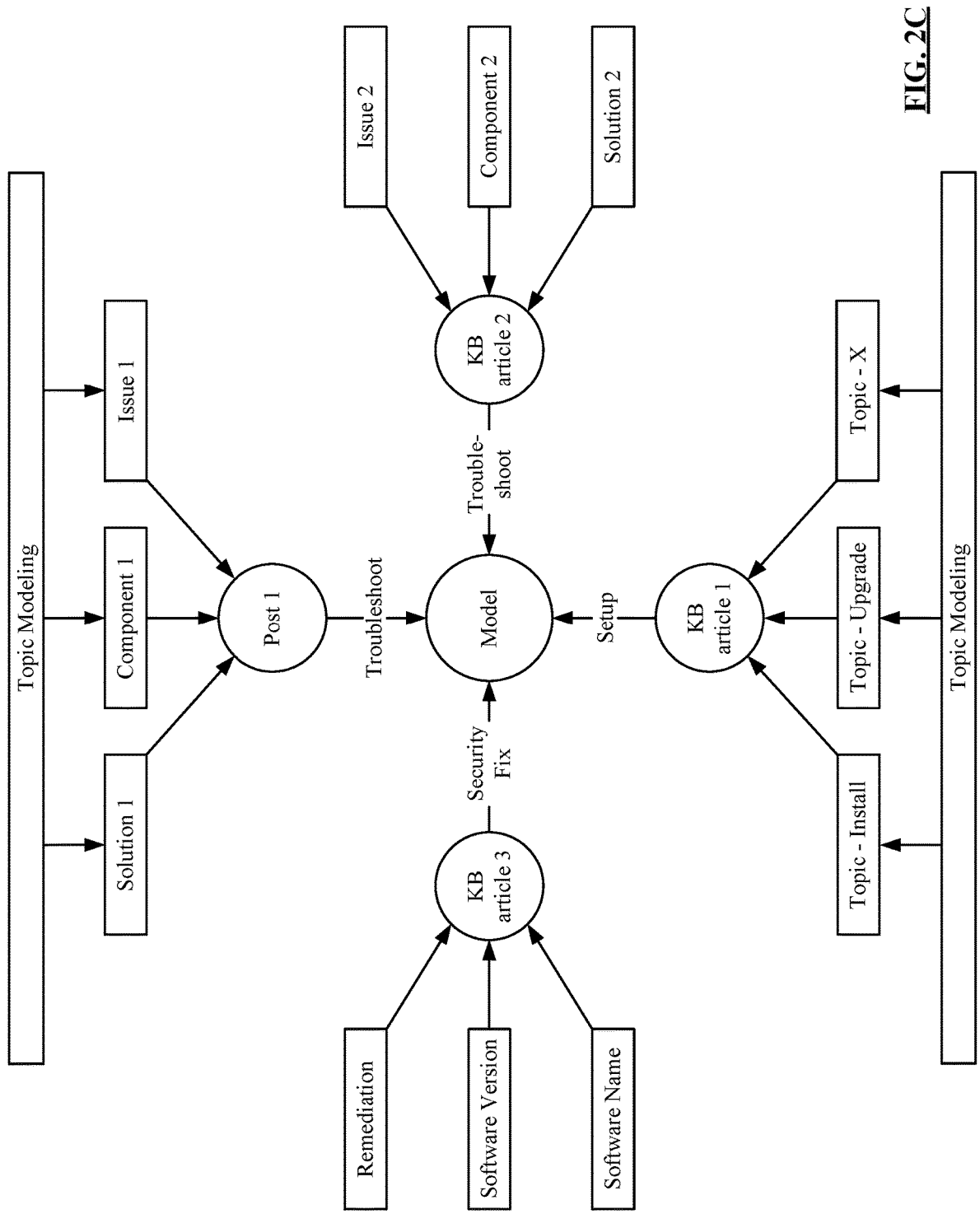
FIG. 2C shows a diagram of a shared storage in accordance with one or more embodiments of the invention.

Turning now to FIG. 2C, FIG. 2C shows a diagram of a shared storage in accordance with one or more embodiments of the invention. In one or more embodiments of the invention, the shared storage may include one or more KB articles (e.g., KB article 1, KB article 2, KB article 3, etc.), one or more posts (e.g., post 1) posted by the customers. In one or more embodiments of the invention, the KB articles (e.g., "How to configure a new network card?", "What fan speeds are needed?", "What is the correct BIOS setting for a particular OS?", etc.) may include remediation, software version, and component information for the new computational device and their related BIOS settings. In an embodiment of the invention shown in FIG. 2C, the shared storage includes both the unstructured data (e.g., topic-install, topic-upgrade, etc.) and structured data (e.g., security fix, setup, etc.).

FIG. 3 shows an exemplary compatible tree (300). The compatible tree (300) shows the various settings and parameters that need to be considered when configuring and/or migrating a BIOS as described for example in the method shown in FIGS. 4 and 5. While shown in FIG. 3 as on particular form, the compatible tree (300) of one or more embodiments of the invention may take any form that provides the functionality of determining the parameters and settings of the BIOS for a new computational device, without departing from the invention. The specific form is only for illustrative purposes and the invention is not restricted to it.

In the compatible tree 300 shown in FIG. 3, a BIOS (310) contains settings (312). The settings are configured based on a plurality of parameters as well as the BIOS release version (330). Each setting (e.g., 312A) is configured based on parameters (322-326) including those dependent on a hardware device (322), the OS (324) and other sources. Each setting (320A-320N) has one or more parameters (322-326) that determine the settings' configuration and/or make up the setting. For example, in a non-limiting example, a processor would have parameters associated with it (e.g., 322) while the OS would have other parameters (e.g., 324 associated with it).

When a BIOS is being migrated from an old computational device to a new computational device, the compatible tree (300) is updated to reflect, changes in hardware (e.g., 322), bios release versions (e.g., 330) and other settings and parameters (e.g., 324 and 326). If a setting and/or its parameters (e.g., 312N and 326) are the same for both the old computational device and the new computational device, they may be migrated without change. However, if, the new computational device is different than the old computational device, such as, for example, a different OS, the OS parameter (e.g., 324) is updated to be appropriate for the new computational device. Other combinations of changes and migrations may be used without departing from the invention.

Figure 4:
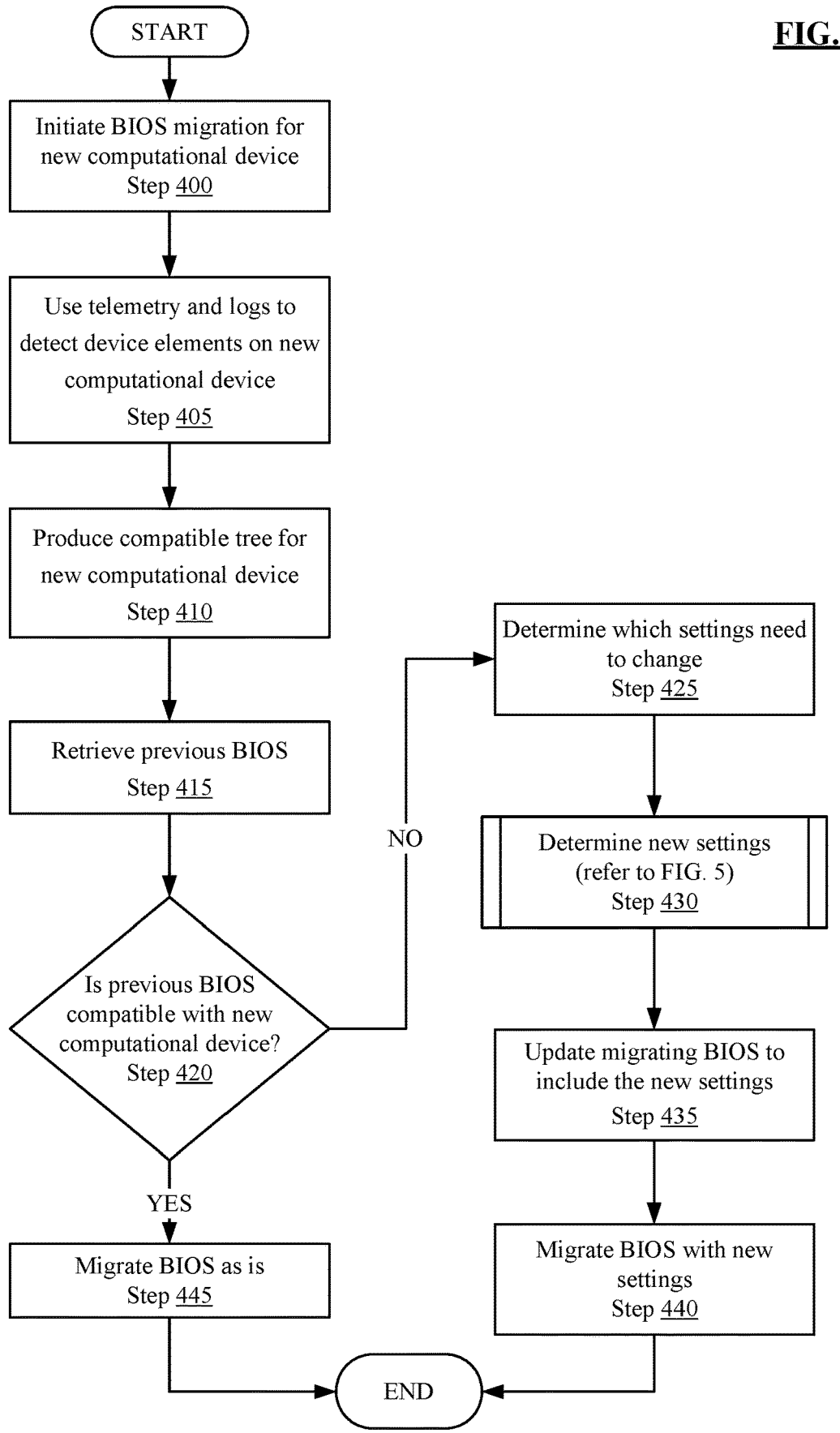
FIG. 4 shows a flowchart of a method for performing a BIOS migration in accordance with one or more embodiments of the invention.

FIG. 4 shows a flowchart describing a method for migrating or twining a BIOS to a new computational device. The method may be performed, for example, by the analyzer (e.g., 130, FIG. 1A) and/or checker (e.g., 120, FIG. 1A) and/or any other part of the system (e.g., 100, FIG. 1A) and computational devices (e.g., 110, FIG. 1A) shown in FIGS. 1A and 1B.

Other components of the system, including those illustrated in FIGS. 1A, 1B, and 2A-2C may perform all, or a portion of the method of FIG. 4 without departing from the invention. While FIG. 4 is illustrated as a series of steps, any of the steps may be omitted, performed in a different order, additional steps may be included, and/or any or all the steps may be performed in a parallel and/or partially overlapping manner without departing from the invention.

In step 400, the migration or twining of the BIOS of an old or pre-existing computational device to a new computational device is initiated. This may be done by a user or administrator of a device, alternatively it may be performed by one or more processes hosted by other computational devices and/or hosted by a manufacture.

For example, for a consumer device, after purchasing a new computational device, the user may request that their previous devices settings and data be migrated, which may include migrating the BIOS. Alternatively in one or more embodiments of the invention, in an enterprise environment this may be initiated when a new server or other computational device is added to a data center, the BIOS from other pre-configured and existing computational devices may be automatically twinned or migrated upon adding the new computational device. The method may be initiated for other reasons then those just describe, and the invention is not limited to those examples.

Once the migration is initiated in step 400, the method proceeds to step 405. In step 405, system telemetry and logs are monitored and/or obtained. Based on the obtained telemetry and/or logs, device elements such as, but not limited to, hardware devices, operating systems, software, etc. associated with the new computational device are identified. In one or more embodiments of the invention, the telemetry and logs may be monitored/obtained only when the migration is initiated in step 400. Alternatively, or in addition, in one or more embodiments of the invention the telemetry and logs may be monitored continuously or periodically such as, but not limited to, every second, minute, hour, etc. as part of routine monitoring, functioning, and/or maintenance of the system.

Once the device elements, including hardware elements associated with the computational device are identified in step 405, a compatible tree is produced for the new computational device in step 410. The compatible tree is produced which determines each setting in the BIOS that needs to be configured for each device elements. The compatible tree determines the relationships between each device element and the BIOS settings in general. The compatible tree, in one or more embodiments of the invention, may be similar to that shown in FIG. 3. In other embodiments of the invention, it may take a different form without departing from the invention.

Once the compatible tree is produced in step 410 the method proceeds to step 415 where the BIOS for the old or previous device (or the source device) is retrieved. The retrieved BIOS is analyzed and compared with the compatible tree to determine any difference between the new computational device and that of the old or source computational device that would require changes to one or more settings of the BIOS.

In step 420, it is determined if the BIOS from the old or previous device is compatible with the new computational device. If it is compatible, the method proceeds to step 445. However, if one or more settings of the BIOS are not compatible with the new computational device, the method proceeds to step 425.

In step 425, the settings that need to be changed in the previous BIOS are identified. This may be done by examining the compatible tree for the new computational device. Using the identification and/or the compatible tree the new settings are then determined in step 430. In one or more embodiments of the invention, step 430 is performed in the manner described in more detail with the method shown in FIG. 5. Alternatively, the new setting may be determined by a user or administrator.

In one or more embodiments of the invention, once the new settings are determined in step 430, the method proceeds to step 435 where the BIOS that is to be migrated is updated to include the new settings. Alternatively, in one or more embodiments of the invention, a user or administrator is notified of the new settings, and the user or administrator may choose to implement the new settings or apply different alternative settings.

Once the BIOS is updated in step 435, in one or more embodiments of the invention, the bios is then migrated, and the updated new settings are used in step 440. This may be done automatically or may be done with a user, administrator, or manufacture manually performing the migration. Alternatively, if in step 420 it is determined the previous BIOS is compatible, the BIOS is migrated as is in step 445.

Once the BIOS is migrated in either steps 440 or step 445, the method of FIG. 4 may end.

Figure 5:
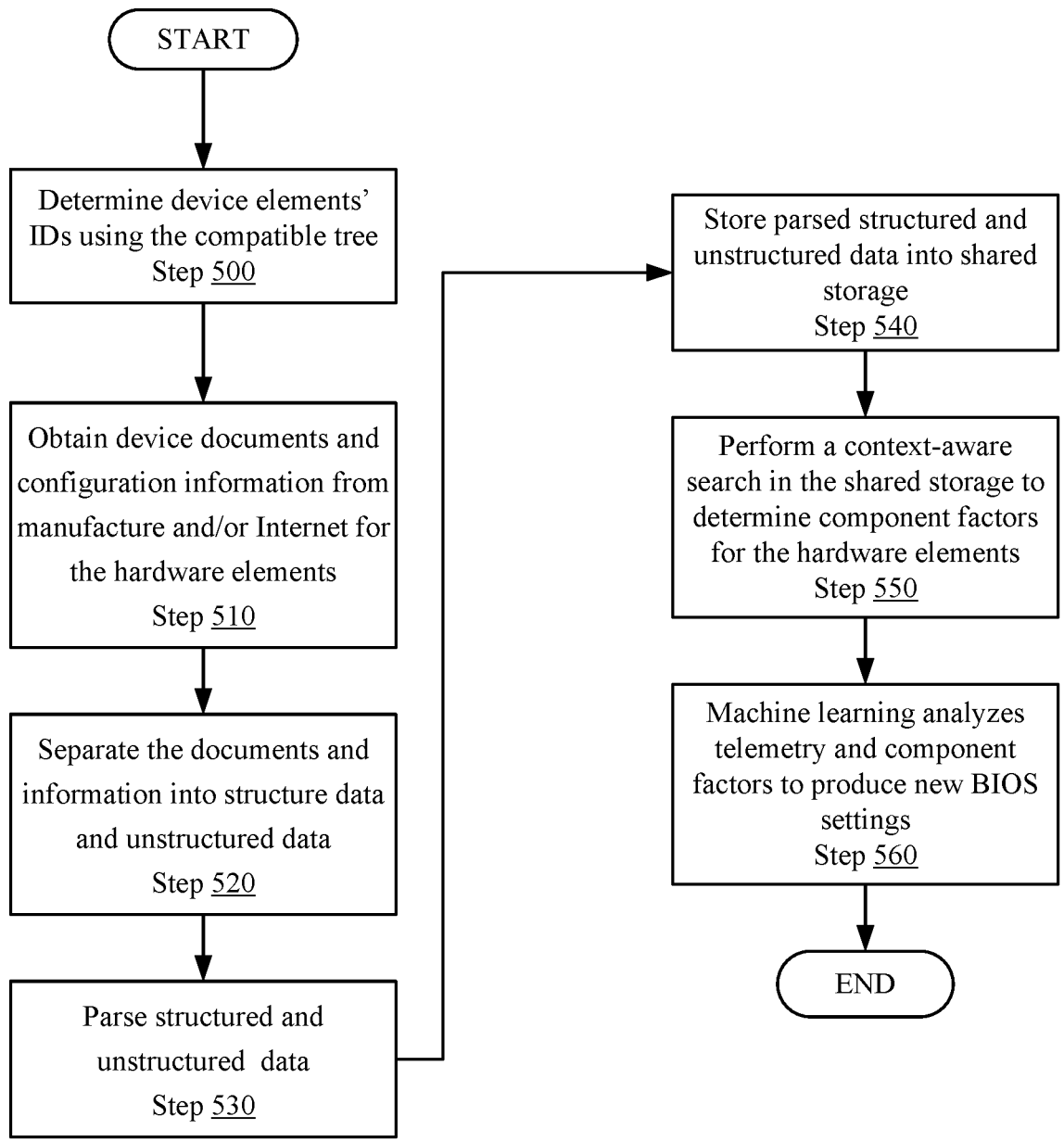
FIG. 5 shows a flowchart of a method for determining new settings for the migrated BIOS in accordance with one or more embodiments of the invention.

FIG. 5 shows a flowchart describing a method for determining new settings for one or more device elements including one or more hardware elements, in accordance with one of more embodiments of the invention. The method may be performed as step 430 of FIG. 4, or any other step of the method of FIG. 4. Alternatively, the method of FIG. 5 may be independent of the method shown in FIG. 4 and may be performed as part of other methods that require determining new BIOS settings. The method may be performed, for example, by the checker and analyzer (e.g., 120 and 130, FIG. 1A), and/or any other part of the system (e.g., 100, FIG. 1A) and computational devices (e.g., 110, FIG. 1A) shown in FIGS. 1A and 1B.

Other components of the system, including those illustrated in FIGS. 1A, 1B, and 2A-2C may perform all, or a portion, of the method of FIG. 5 without departing from the invention. While FIG. 5 is illustrated as a series of steps, any of the steps may be omitted, performed in a different order, additional steps may be included, and/or any or all the steps may be performed in a parallel and/or partially overlapping manner without departing from the invention.

In step 500, each device element related to the computational device is identified using the compatible tree. The device element may comprise of any of a hardware element (such as, but not limited to, a CPU, memory, storage, etc.), related software, applications, or other elements of the computational device. This may be done by utilizing the compatible tree, such as the one prepared in step 410 of FIG. 4. Other methods of identifying the device elements that make up the new computational device, such as using telemetry and/or user input, may be used without departing from the invention. Once the device elements such as the hardware elements and/or related software have their identities determined, the method proceeds to step 510.

In step 510, device documents and configuration information from the manufacture and/or Internet for the hardware elements and/or ore related software are obtained. The information, in one or more embodiments of the invention, may be in the form of KB articles and other documentation, such as but not limited to, that is shown and discussed in FIG. 2C. The pertinent documentation is obtained, and in step 520 each document is separated into structure and unstructured data.

Once the documentation is obtained and separated in steps 510 and 520, the method proceeds to step 530. In step 530 the structured and unstructured data is parsed, e.g., in accordance with FIG. 2B, to determine the information that is useful in configuring the BIOS for the device elements, such as the hardware elements and/or related software. This parsed data is stored in the shared storage (e.g., 114, FIG. 1A) in step 540.

In Step 550, the parsed data stored in step 540 is searched using a context-aware search to determine the component factors for each of the device elements. In one or more embodiments of the invention the context-aware search is performed by using machine learning. The machine learning may take a variety of forms including reinforced learning. Other methods of searching the parsed data may be used without departing from the invention. The result of the searching is then analyzed by the machine learning along with telemetry in step 560 to produce the new BIOS settings for the hardware elements and/or related software that has changed in the new computational device.

Once the new BIOS settings are produced in step 560, the method of FIG. 5 may end.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many diverse types of computing devices exist, and the aforementioned input (610) and output device(s) (608) may take other forms.

In general, embodiments described above relate to methods, systems, and non-transitory computer readable mediums storing instructions for migrating BIOS settings between old and new computational devices. The method analyzes logs, telemetry, and appropriate documentation to determine the settings that need to be altered. The methods determine which settings, if any, need to be altered to consider changes in the hardware of the new computational device compared to the old computational device with little or no user effort. This allows a BIOS to be migrated in both an enterprise environment and in a consumer/standalone environment with both improved efficiency and effectiveness.

The problems discussed above should be understood as being examples of problems solved by embodiments of the invention, and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments may be devised which do not depart from the scope of embodiments as disclosed herein. Accordingly, the scope of embodiments described herein should be limited only by the attached claims.

What is claimed is:

1. A method for migrating BIOS settings to a new computational device, the method comprising:
   retrieving telemetry from the new computational device;
   detecting, using the telemetry, one or more hardware elements comprising the new computational device;
   identifying the one or more hardware elements comprising the new computational device;
   creating, using the identity of the one or more hardware elements, a compatible tree for the new computational device,
      wherein creating the compatible tree comprises:
         retrieving configuration information and device documents for each of the identified one or more hardware elements from an external source,
         parsing the retrieved configuration information and device documents into a searchable document, saving the searchable document into shared storage;
         performing a context-aware search of the searchable document to determine component factors for each of the identified one or more hardware elements, and
         analyzing the component factors using machine learning to produce the compatible tree comprising each of the identified one or more hardware elements;
   retrieving previous BIOS settings that are to be migrated;
   determining, using the compatible tree, one or more BIOS settings of the previous BIOS settings that need to be changed;
   creating new BIOS settings for the one or more BIOS settings that need to be changed;

updating the previous BIOS setting with the new BIOS settings to produce updated BIOS settings; and migrating the updated BIOS settings to the new computational device, wherein the BIOS on the new computational device is configured with the updated BIOS settings.

2. The method of claim 1, wherein the updating the previous BIOS settings further comprises of notifying a user of the new BIOS settings.

3. The method of claim 1, wherein the new computational device is part of a data center.

4. The method of claim 1, wherein the new computational device is a stand-alone computational device.

5. The method of claim 1, wherein the configuration information and device documents include knowledge based (KB) articles associated with the identified one or more hardware elements.

6. The method of claim 1, wherein creating new BIOS settings is performed using the component factors to determine the new BIOS settings for the one or more BIOS settings that need to be changed.

7. The method of claim 1, wherein creating new BIOS settings is performed using machine learning.

8. A non-transitory computer readable medium comprising computer readable program code, which when executed by a computer processor enables the computer processor to perform a method for migrating BIOS settings to a new computational device, the method comprising:

retrieving telemetry from the new computational device;
detecting, using the telemetry, one or more hardware elements comprising the new computational device;
identifying the one or more hardware elements comprising the new computational device;
creating, using the identity of the one or more hardware elements, a compatible tree for the new computational device,
wherein creating the compatible tree comprises:
retrieving configuration information and device documents for each of the identified one or more hardware elements from an external source,
parsing the retrieved configuration information and device documents into a searchable document,
saving the searchable document into shared storage,
performing a context-aware search of the searchable document to determine component factors for each of the identified one or more hardware elements, and
analyzing the component factors using machine learning to produce the compatible tree comprising each of the identified one or more hardware elements;
retrieving previous BIOS settings that are to be migrated;
determining, using the compatible tree, one or more BIOS settings of the previous BIOS settings that need to be changed;
creating new BIOS settings for the one or more BIOS settings that need to be changed;
updating the previous BIOS setting with the new BIOS settings to produce updated BIOS settings; and
migrating the updated BIOS settings to the new computational device, wherein the BIOS on the new computational device is configured with the updated BIOS settings.

9. The non-transitory computer readable medium of claim 8, wherein updating the previous BIOS settings further comprises notifying a user of the new BIOS settings.

10. The non-transitory computer readable medium of claim 8, wherein the new computational device is part of a data center.

11. The non-transitory computer readable medium of claim 8, wherein the new computational device is a stand-alone computational device.

12. The non-transitory computer readable medium of claim 8, wherein the configuration information and device documents include knowledge base (KB) articles associated with the identified one or more hardware elements.

13. The non-transitory computer readable medium of claim 8, wherein creating new BIOS settings is performed using the component factors to determine the new BIOS settings for the one or more BIOS settings that need to be changed.

14. A system comprising:
an old computational device;
a new computational device; and
a checker which comprises:
at least one processor; and
at least one memory that includes instructions, which when executed by the processor, performs a method for migrating BIOS settings to the new computational device, the method comprising:
retrieving telemetry from the new computational device;
detecting, using the telemetry, one or more hardware elements comprising the new computational device;
identifying the one or more hardware elements comprising the new computational device;
creating, using the identity of the one or more hardware elements, a compatible tree for the new computational device,
wherein creating the compatible tree comprises:
retrieving configuration information and device documents for each of the identified one or more hardware elements from an external source,
parsing the retrieved configuration information and device documents into a searchable document,
saving the searchable document into shared storage,
performing a context-aware search of the searchable document to determine component factors for each of the identified one or more hardware elements, and
analyzing the component factors using machine learning to produce the compatible tree comprising each of the identified one or more hardware elements;
retrieving previous BIOS settings that are to be migrated;
determining, using the compatible tree, one or more BIOS settings of the previous BIOS settings that need to be changed;
creating new BIOS settings for the one or more BIOS settings that need to be changed;
updating the previous BIOS setting with the new BIOS settings to produce updated BIOS settings; and
migrating the updated BIOS settings to the new computational device, wherein the BIOS on the new computational device is configured with the updated BIOS settings.

15. The system of claim 14, wherein updating the previous BIOS settings further comprises of notifying a user of the new BIOS settings.

16. The system of claim 14, wherein the new computational device is part of a data center.

17. The system of claim 14, wherein the new computational device is a stand-alone computational device.

* * * * *